A. N. ROSE.
MEASURING LIQUID DISPENSER.
APPLICATION FILED FEB. 18, 1916.

1,350,739.

Patented Aug. 24, 1920.
4 SHEETS—SHEET 1.

INVENTOR
Alonzo N. Rose,
BY
Willie Fowler
ATTORNEY

UNITED STATES PATENT OFFICE.

ALONZO N. ROSE, OF MOUNT VERNON, NEW YORK.

MEASURING LIQUID-DISPENSER.

1,350,739.  Specification of Letters Patent.  Patented Aug. 24, 1920.

Application filed February 18, 1916. Serial No. 79,106.

*To all whom it may concern:*

Be it known that I, ALONZO N. ROSE, a citizen of the United States, residing in Mount Vernon, county of Westchester, State of New York, have invented certain new and useful Improvements in Measuring Liquid-Dispensers, of which the following is a specification.

My invention relates to apparatus for dispensing liquids and beverages from a container the outlet of which is directed downwardly and the upper part of which is closed against the admission of air, an example of such a container being an ordinary bottle turned upside down and I shall employ the term inverted-bottle hereinafter to designate a container on the order referred to. It is a great desideratum in dispensing and selling a quantity of liquid drawn from a bottle to have such quantity automatically measured with substantial accuracy at each operation and to check the flow of liquid from the bottle with a clean cut-off and my present invention seeks to provide an apparatus having these characteristics as well as certain other peculiar features, all as hereinafter fully set forth and then pointed out in the claims.

I have illustrated types of my invention in the accompanying drawings, wherein—

Figures 3, 4, 5, 6, 7:
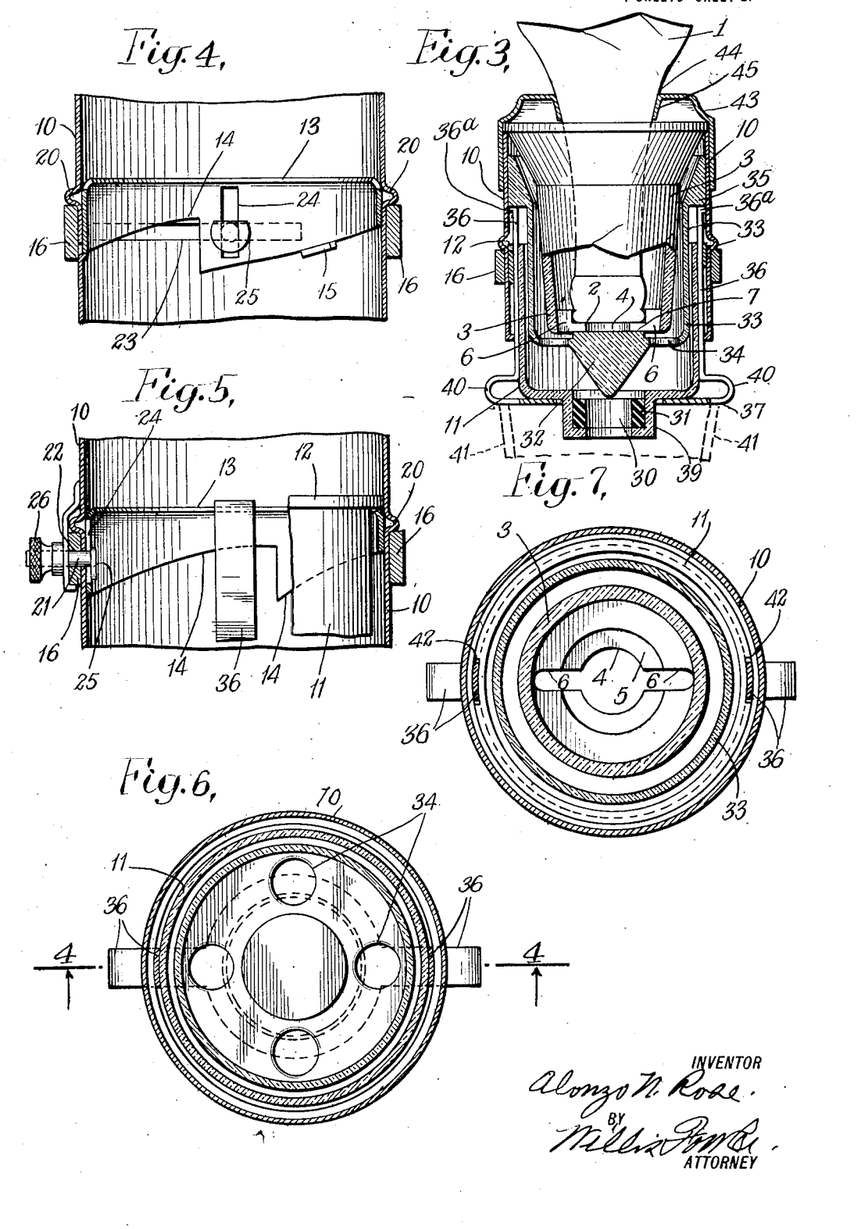
Fig. 3, is a similar view to that shown in Fig. 1, but with the respective movable parts shown as moved out of normal positions to draw off the measured quantity of liquid and to close the bottle-mouth, the measuring-chamber under this condition being collapsed or completely contracted.
Fig. 4, is an enlarged vertical sectional view of certain parts of the apparatus, as hereinafter described.
Fig. 5, is a similar view to Fig. 4, with the plane of the section at right angles to that indicated in said view, the plane of the section being indicated by line, 5—5, in Fig. 2.
Fig. 6, is an enlarged horizontal sectional view of the apparatus, the plane of the section being indicated by line 6—6, Fig. 1.
Fig. 7, is an enlarged horizontal sectional view of the apparatus, the plane of the section being indicated by line 7—7, Fig. 1.

Referring to the drawings, in which like numbers of reference designate like parts throughout, 1 indicates a bottle turned up side down with its mouth 2, resting upon a support 3, which in the construction shown in the preferred form of the apparatus as shown in Figs. 1 to 7 inclusive, is cup-shaped with a central opening 4 in the bottom thereof around which opening is an annular depression 5, in which the bottle mouth fits. The opening 4 is extended laterally at two points 6, 6 and the bottle mouth is at all times in communication with these openings. The area of the laterally extended openings 6 being quite contracted, the liquid will not flow from the bottle mouth when the lower end of the opening 4 and a portion of each extension 6 is closed by the bottle mouth valve 7, as indicated in Fig. 3. The bottle support 3 has its upper end flaring at 8 somewhat funnel shaped and it is provided with an external flange 9 which rests upon the upper end of the exterior casing 10 and while the bottle support is held in place by its weight and may be readily removed it maintains its position vertically at all times so that its lower end remains fixed at a certain level within the measuring chamber 11, which is also cup-shaped and the bottle holder depends within this chamber.

The upper end of the measuring chamber 11 is formed with an external flange 12, (see particularly Fig. 5), which rests upon the upper end of the cam-ring 13, which serves in its up and down vertical adjustment to vary the vertical position of the measuring chamber, relatively to the lower end of the bottle holder 3, whereby the space between the two is altered and the capacity of the measuring chamber changed accordingly.

The cam-ring 13, is mounted to fit snugly within the outer casing 10 and has its lower edge formed with a series of similar cam faces 14, each one of which rides over a lug 15, which is fixed upon the interior wall of the casing 10, and has its upper surface inclined substantially at the angle of the cam face 14. The casing 10 fits snugly within a metal band or hoop 16, which is secured to the upper end of a stand 17, which is made in the form of a tripod and has its lower end provided with a circular pan 18, in which is placed a removable perforated tray 19, upon which a drinking glass may be rested. The cylindrical casing 10 is provided upon its exterior surface with a peripheral rib 20, and the casing 10 being inserted within the band 16, is forced down within the same until the rib 20 makes contact therewith so as to support the casing which at the same time may be rotated horizontally by grasping it with the hand and turning it on the band 16. A pin or stud 21 is passed loosely through a perforation 22 in the band 16 (see Fig. 5), and extends thence loosely through the horizontal slot 23 in the casing 10, and thence through a vertical slot 24 formed in the cam-ring 13. Upon the inner end of the pin 21 within the cam ring, is secured a fixed piece 25 and the outer end of the pin 21 is screw threaded and provided with a thumb-nut 26, so that by turning the nut down hard against the band, the fixed piece 25 will serve to bind the parts together and lock them in fixed relation and hold the cam and the measuring chamber in adjusted positions. Upon releasing the thumb nut 26 the casing 10 may be turned a slight distance in one direction or the other and cause the cam-ring 13 to move up or down, as the case may be, so as to adjust it vertically and when so adjusted the parts may then be locked together in order to maintain the measuring chamber in its new adjustment whatever it may be.

Figures 1, 2:
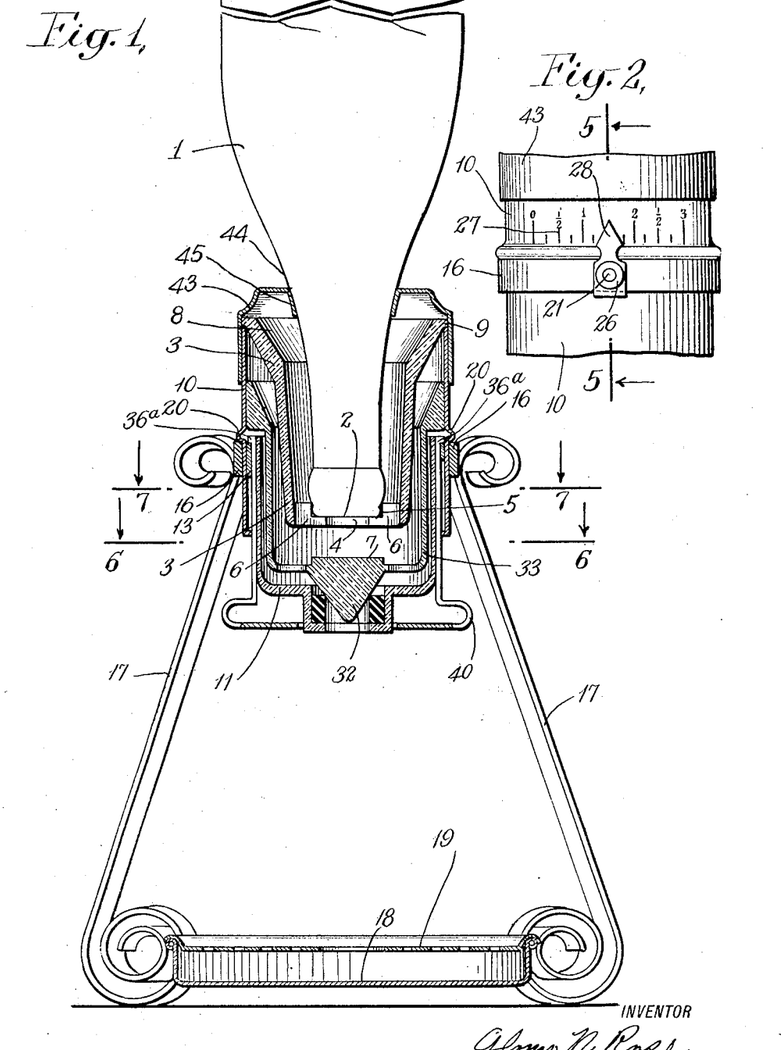
Figure 1, is a central vertical section of my improved apparatus mounted on a stand and with the respective movable parts in normal positions assumed when a measured quantity of liquid stands in the apparatus ready to be drawn off by the opening of the valve controlling the outlet.
Fig. 2, is an enlarged exterior view of a portion of the apparatus showing the scale indicating liquid ounces of the measured liquid and an index member coöperating therewith.

In Figs. 2 and 5, I have shown a scale 27 on the exterior of the casing 10 and an index or pointer 28 mounted upon the stud 21; this scale starting at zero is marked off in quarters, halves and full ounces up to the capacity of three ounces and by turning the casing to the desired point on the scale the measuring chamber is regulated in size to measure the corresponding amount of the liquid in ounces or fractions thereof.

The measuring chamber 11, is provided at its lower end with an outlet 30 in which is placed an annular piece of suitable soft material 31, against which the vertically moving conical shaped valve 32, seats itself, as indicated in Fig. 1. This conical valve 32 is in this form of the invention shown as combined with the bottle-mouth valve 7, which has hereinbefore been referred to. These valves are carried by a vertically reciprocating carrier 33, which is cup-shaped and has its bottom provided with a series of perforations 34, so as not to interfere with the flow of liquid in the measuring chamber into which the carrier projects and it is nested between the bottle support 3, and the measuring-chamber 11, and is preferably kept out of contact with these parts to avoid unnecessary friction in the movement of the carrier. The upper end of the valve carrier, which is cylindrical in form, is provided with an outwardly projecting flange 35, the outer face of which has a somewhat extended bearing within the exterior surface of the shell 10, which serves as a guide for the sliding movement of the carrier. The under side of the carrier flange 35, is engaged by the upper ends of the lifting-arms 36, which extend from the lifting-frame 37, which lies beneath the measuring chamber 11, and is provided with a central opening 38 fitting loosely around the downwardly projecting cylindrical outlet 39, of the measuring chamber. In the present construction I show two of the lifting-arms 36 arranged diametrically opposite each other with the lower part of each bowed or bent at 40, to provide an extended area sufficiently extended in the lateral direction to readily be engaged by the upper end of a drinking glass when placed beneath the same and moved upwardly by hand, the glass being indicated partly in dotted lines 41, in Fig. 3. The lifting arms 36, slide somewhat freely between the exterior surface of the measuring-chamber 11 and the interior of the cam-ring 13, and also the lower end of the inclosing casing 10, as indicated in Figs. 1, 3, 6 and 7. The flange 12 of the chamber 11 is notched at 42, 42, to permit the lifting arms 36, to pass beyond the same in order to engage the upper end of the valve-carrier 33, and the carrier is thus given a firm guiding bearing in its reciprocating movements.

In order to steady the upper end of the inverted bottle 1, I provide a collar 43, the outer part of which fits snugly over the exterior of the upper end of the casing 10, and is vertically adjustable thereon, so that the central opening 44 which has a downwardly extending flange 45, will fit the bottle neck snugly and thereby hold the bottle firmly in place. As the size of the bottle neck varies this vertical adjustment of the collar enables it to be quickly fitted to the bottle neck when the bottle mouth is resting on its support 3, in its operative position.

The valve 7, which serves to cut off quickly the flow of liquid from the bottle, has its face slightly raised above the carrier 33, and is of slightly smaller area than the bottom of the bottle-support, so that when the valve 7 closes against the under side of the bottle-support, as indicated in Fig. 3, a slight space is left between the under side of the bottle-support and the upper side of the carrier and the two lateral openings are left partly open or uncovered by the valve. This construction prevents the trapping of the liquid above the bottle-mouth support and also provides a cushion effect, in the sharp closing movement of the valve 7 in cutting off the flow. This arrangement prevents a portion of the measured liquid being forced back into the bottle as would be the case if the valve 7 were permitted to seat itself completely over the bottle-mouth. The lateral openings 6, also insures the level of the liquid being maintained substantially at the bottle-mouth or the lower surface of the bottle mouth support.

Each lifting arm 36, has its free end provided with a lateral projection 36ª, which rests upon the upper edge of the cam-ring 13, when the lifter is at its lowest point of its range of vertical movement, and this retains the lifter in position and prevents it from dropping out of place, as will be understood from Fig. 1. From Fig. 1 it will also be noted that the lifter has a slight lost motion, as indicated by the space between the under side of the flange 35 of the valve carrier, and the upper edge of the measuring chamber 11. This causes the valve carrier to be quickly raised when the lifting device is pushed upwardly.

In the construction thus described, the normal positions of the various parts are shown in Fig. 1, with the outlet valve 32 closed on its seat. Under this condition the liquid flowing from the inverted bottle will rise in the measuring chamber to a point substantially at the level of the under side of the bottle mouth support 3, and when this level is reached the liquid serves, in a manner well known, to automatically shut off the flow of liquid from the bottle and this level is maintained until the outer valve is opened to draw off the liquid. By a predetermined relative adjustment of the bottle mouth support and the measuring chamber, a certain quantity of liquid measured in liquid ounces will stand in the measuring chamber when the bottle mouth is automatically sealed and this measured quantity is quickly drawn off by sharply lifting the lifting device 40, which may be done by placing an ordinary drinking glass beneath the lifting device and pressing the device upwardly by the upper edge of the glass. This vertical movement of the lifter opens the outlet valve 32 and simultaneously closes the bottle mouth valve 7, against the under side of the bottle-mouth support thereby shutting off the flow of liquid from the bottle and permitting the entire measured contents of the chamber 11 to flow into the glass beneath the outlet 30.

The capacity of the measuring chamber may be quickly changed by turning the cam-ring 13, in the manner hereinabove described, so as to either raise or lower the cam-ring and correspondingly raise or lower the measuring chamber 11, the scale on the exterior of the shell 10 as indicated in Fig. 2 being used in making such adjustment. This adjustment varies the depth of the measuring chamber and consequently the capacity thereof.

Of the parts thus far described I prefer to make the bottle-mouth carrier 3, the valves and the valve carrier 33, likewise the measuring chamber 11, of materials other than metal, for example glass or suitable earthenware, which materials will resist the action of certain beverages containing acids and will also give these parts a desired weight so that they will keep their normal positions by gravity.

The apparatus may be readily flushed out with clean water from an inverted bottle by lifting the valve carrier to a point at which both valves remain open, thereby permitting the water to flow around the valves and through the measuring chamber and pass out of the outlet at the lower end.

In Figs. 8 to 11, inclusive, I show a modified form of the apparatus, in which the inverted bottle 50, has its mouth 51 resting on the cup-shaped support 52, over the opening 53 therein and the support is vertically adjustable relatively to the measuring-chamber 54, into which the support depends. The upper end of the support 52, is rounded at 55, for receiving the shoulder of the bottle and is provided with a downwardly extending flange 56 which fits snugly over the upper end of the cylindrical outer shell or casing 57, which is adapted to be held in fixed position in the supporting hoop or band 16, (see Fig. 9) which may be mounted on a suitable stand as hereinbefore described in reference to the preferred form of the apparatus.

Figures 8, 9:
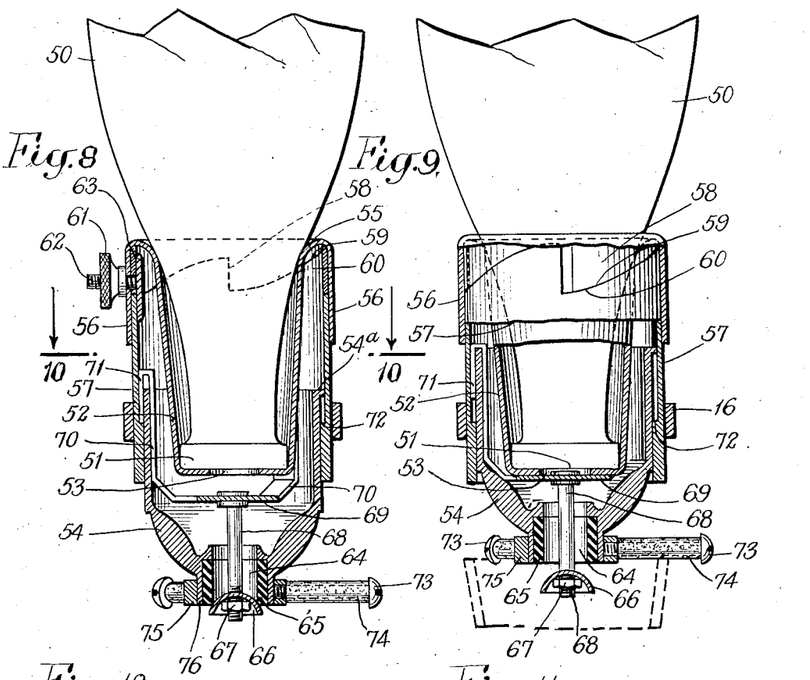
Fig. 8, is a central vertical sectional view of a modified form of the apparatus with the parts shown in normal positions and the drawing off valve closed.
Fig. 9, is a similar view to that shown in Fig. 8, with the parts moved out of normal positions and the drawing off valve closed, likewise the valve controlling the bottle mouth.
Figure 10:
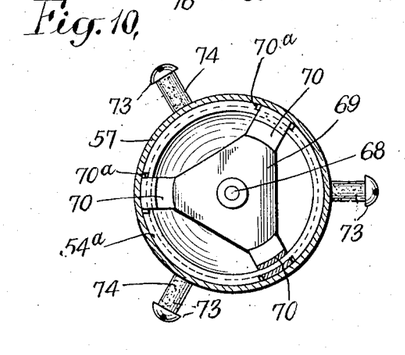
Fig. 10, is a top view of the apparatus, with the inverted bottle and the holder therefor, removed.
Figure 11:
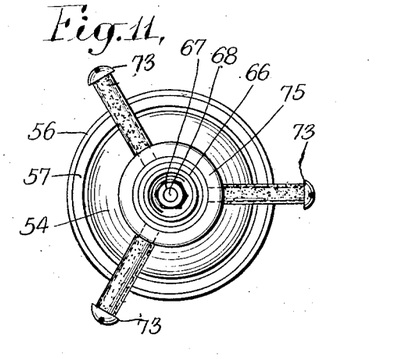
Fig. 11, is an under side view of the apparatus shown in Fig. 9.

A cam-ring 58, is secured within the flange 56 of the support 52 and is held in fixed relation therewith in a suitable manner. This cam-ring has a series of inclined cam faces 59, which slide over corresponding cam surfaces 60, formed upon the upper edge of the outer casing 57. By grasping the exterior of the flange 56 of the bottle support 52, and rotating it in one direction or the other upon the casing, the action of the cams serves to raise or lower the bottle support and thereby adjust the same vertically in order to vary the capacity of the measuring chamber. When the bottle support 52 is raised the level of the liquid which stands normally in the measuring chamber is raised, and in a corresponding manner when the bottle support is adjusted so as to lower it, the level of the liquid in the measuring chamber is lowered and the quantity of liquid thereby decreased.

When the bottle support 52, is adjusted so as to give the desired quantity of liquid in the measuring chamber, it is then locked to the fixed casing 57, by turning down the thumb screw 61, on the threaded stud 62, which passes loosely through both the flange 56, of the support and the casing 57, and is provided upon its inner end with a fixed clamping piece, 63.

The measuring chamber 54 which is cup-shaped, slides vertically within the lower end of the cylindrical casing 57, and has its lower end provided with a centrally located outlet 64 which is lined with a tubular piece of soft material 65 for the outlet valve 66 to seat itself against. The valve 66 is dome shaped and is secured by means of a nut 67 to the lower threaded end of the valve stem 68 which passes up through the outlet 64, and is attached to the center of a triangular shaped plate 69 which is provided with three upwardly extending arms 70, which are placed equal distances apart and have their upper ends formed with downwardly projecting hooks 71, and which parts form a carrier for the part 69, which serves as a valve for closing the outlet 53, in the lower end of the bottle support 52 when the outlet valve 66 is open. The closing of the valve 69 serves to cut off the flow of liquid from the bottle. The hooked ends 71 pass over the upper edge of the measuring chamber 54 and the free ends thereof rest upon a shoulder 72 on the interior of the outer casing 57. The arms 70 pass loosely through notches 70ª in the rim 54ª of the measuring chamber 54. The parts are so proportioned that when the hooked ends 71, engage the shoulder 72, the measuring chamber 54, with its adjuncts and including the weight of the measured liquid is then supported by the valve 66, its valve stem and the carrier arms 70, the hooked ends of which support this weight upon the shoulder 72. This maintains the valve 66, tightly closed.

A set of lifting arms 73 which are preferably covered with rubber 74 are secured in radial positions at equal distances apart to a collar 75 fitting around the tubular extension 76 of the outlet 64 of the measuring chamber. This collar fits tightly around the tubular part 76 so as to be held in place thereon and the arms carried by the collar are designed to be engaged by the upper edge of an ordinary drinking glass when the same is pressed upwardly beneath the outlet. By thus lifting the arms 73, the measuring chamber 54 is carried upwardly into the position shown in Fig. 9 and in its upward movement the upper end of the measuring chamber engages and lifts the valve carrier 70 in order to close the valve 69 against the under side of the bottle support 52 to cut off the flow from the bottle while the outlet valve 66 is open. This movement serves to empty the measuring chamber of the measured quantity of liquid into the glass below. When the glass is removed, from contact with the lifter, the weight of the measuring chamber and its adjuncts will cause it to drop down into normal position, as shown in Fig. 8, and in this movement to engage the outlet valve 66 and carry down with it the connected valve 69, of the bottle mouth, so that a fresh quantity of liquid can flow from the bottle into the measuring chamber and rise to the level of the bottle mouth for another operation of the apparatus.

Figures 12, 13, 14, 15:
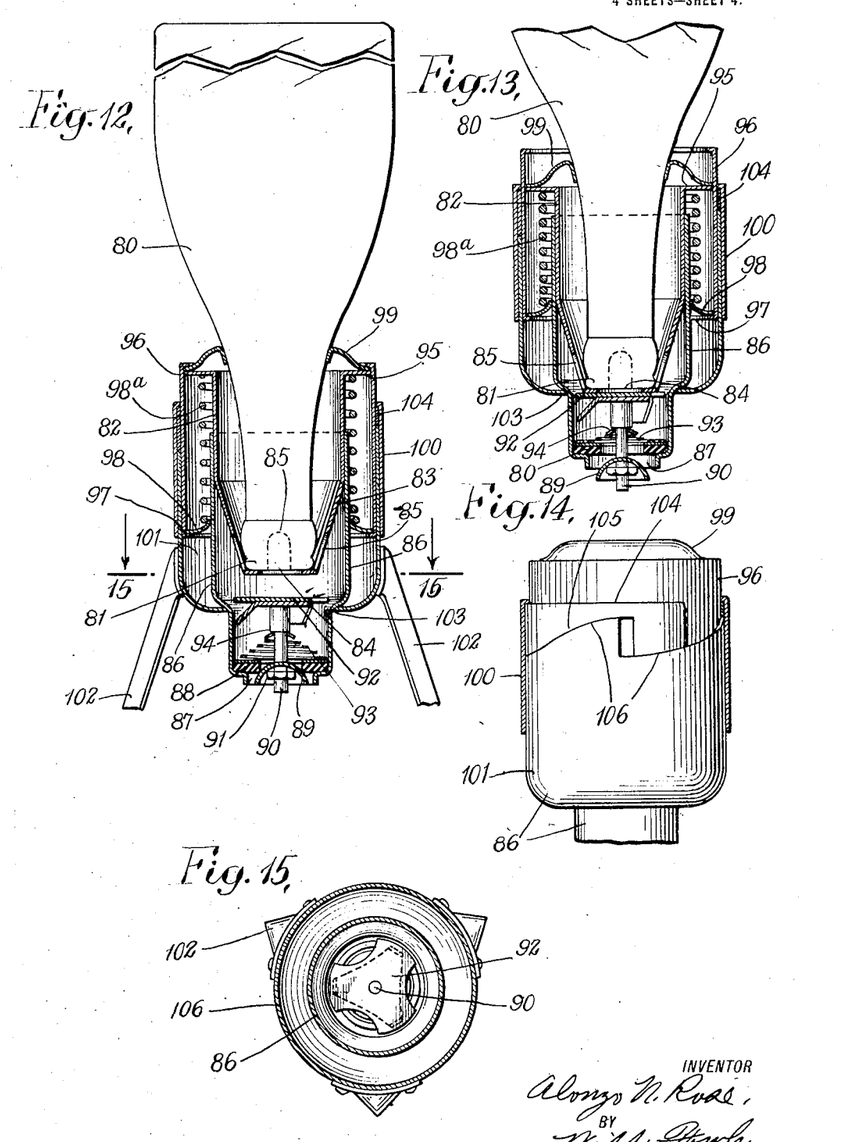
Fig. 12, is a central vertical sectional view of another modified form of the apparatus with the parts shown in normal positions with the drawing off valve closed.
Fig. 13, is a similar view to that shown in Fig. 12, with the parts moved out of normal positions with the drawing off valve opened and the bottle mouth closed by its valve.
Fig. 14, is an exterior view of the outer shell and the cam for vertically adjusting the parts to vary the capacity of the measuring chamber, the exterior collar on the shell being in vertical section.
Fig. 15, is a horizontal sectional view of the apparatus shown in Fig. 12, the plane of the section being indicated by line 15—15, in Fig. 12.

In the modification shown in Figs. 12 to 15 inclusive, the inverted bottle 80 has its mouth 81 supported upon the bottom of the cup-shaped support 82, the lower end of which is contracted and made tapering as indicated in 83, and is provided with a central opening 84 in its bottom and lateral openings 85 in its side walls at the bottom. The bottle support 82 slides vertically within the liquid measuring chamber 86, the lower part of which is contracted and formed with an outlet 87 through which the liquid is drawn from the chamber. The outlet opening 87 is provided with a washer 88 of suitable soft material for receiving the outlet valve 89 which closes upwardly against its valve seat. The valve 89 which is dome-shaped is secured to the stem 90 by means of a nut 91 and upon its upper end it carries a valve 92 which closes upwardly against the under side of the bottle support 82 so as to shut off the flow of liquid from the bottle mouth, as indicated in Fig. 13. A spiral spring 93 is placed around the valve stem 91 with its upper end engaging a fixed part 94 of the valve stem and its lower end engaging the valve seat. Normally this spring keeps the valve 89 tightly closed.

The upper end of the bottle support 82 is provided with an external flange 95 which in the vertical movements of the bottle support which is spring mounted, engages the interior of the cylindrical shell 96, the lower end of which is provided upon its interior with a shoulder 97 and a ring shaped plate 98 is inserted between the exterior of the measuring chamber, and the shoulder 97 on the casing 96 and this plate receives the lower end of the spring 98$^a$ which surrounds the bottle holder and part of the measuring chamber and has its upper end in engagement with the under side of the flange 95 of the bottle support. A collar 99 is secured to the upper side of the flange 95 of the bottle support and the neck of the bottle passes through the collar and engages the same, as indicated in the drawings. The device is operated by grasping the bottle and bearing down upon it so as to compress the spring 98$^a$. This movement forces the bottle support 82 downwardly until it collides with the valve 92, and the continued downward movement of the bottle support then opens the outlet valve 89, thereby permitting the outflow of the measured quantity of liquid in the measuring chamber, as shown in Fig. 13. Upon releasing the pressure from the bottle the spring 98$^a$ forces the bottle support and bottle upwardly, thereby moving the bottle mouth away from the valve 92, at the same time permitting the spring 93 to close the outlet valve 89 on its seat, as shown in Fig. 12. Under this condition the liquid from the bottle will flow therefrom and fill the measuring chamber to the level of the under side of the bottle support which is practically the bottle mouth, whereupon the apparatus may again be operated in the manner described for obtaining a like measured quantity of liquid. Any liquid that may find its way into the interior of the cup-shaped support and around the bottle mouth will readily pass out through the lateral openings 85.

Upon the exterior of the casing 96 is a broad flange 100 which is spaced a sufficient distance from the casing 96 to receive between the two parts the upper end of the cup-shaped shell 101 to which is secured the legs 102 of the stand upon which the apparatus is mounted. The lower end of the shell 101, is formed with a central opening at 103 through which the reduced lower end of the measuring chamber 86 projects and which remains in relatively fixed relation with the shell. Within the flange 101 at the upper part thereof where it is connected with the casing 96 is secured in fixed relation therewith; the cam-ring 104 (see Fig. 14) having a series of cam faces 105 which slide on similar cam faces 106 which are formed on the upper edge of the shell 101. The parts 101, 104 and 96 being secured together, when the flange 100 is turned in one direction it will raise these parts by means of the cams, together with the annular plate 98 and the spring 98$^a$ and the holder 82 likewise the contained bottle and this elevation of these parts will increase the capacity of the measuring chamber. A reverse turning movement of the part 100 will serve to lower these parts and carry the bottle holder down into the measuring chamber so as to reduce its capacity. In this way a certain measured quantity of liquid may be obtained by predetermined adjustment.

In making my improved apparatus I use glass or suitable earthenware for practically all of the interior parts with which the liquid may come in contact with so that in dispensing different kinds of fruit juices the acids therein cannot affect the apparatus and in this way the life of the apparatus is prolonged.

With this apparatus, the original bottle of well known beverages or fruit juices now on the market, may be used and this of course is of great importance in dispensing such liquids.

Having thus described my invention, what I claim and desire to secure by Letters Patent is:—

1. In a measuring dispenser for liquids, the combination of a support for an inverted bottle, a measuring-chamber in communication with the bottle-mouth and adapted to maintain liquid thereabout for sealing the same, a valved outlet through which the measured liquid is drawn from said chamber, means for cutting off the flow of liquid from the bottle-mouth when the measured liquid is drawn from said chamber and said means being operatively connected with said valved outlet.

2. In a measuring dispenser for liquids, the combination of a support for the inverted bottle, a measuring chamber in communication with the bottle-mouth and adapted to maintain liquid thereabout for sealing the mouth, and having a valved outlet through which the measured liquid is drawn from said chamber, and means for simultaneously opening said outlet and closing the bottle-mouth to cut off the flow of liquid therefrom.

3. In a measuring dispenser for liquids, the combination of a support for the inverted bottle, a measuring chamber surrounding the lower end of the support and into which the mouth of the inverted bottle projects so that the rising of the liquid within the chamber automatically seals the mouth of the bottle to stop the flow therefrom, the said bottle support and measuring chamber being relatively adjustable to vary the distance between the mouth of the bottle and the bottom of said chamber to vary the quantity of liquid measured by the said chamber, means for drawing off the liquid from the measuring chamber, a cut off device adapted to cut off the flow of liquid from the bottle when the said drawing off means is opened, the said cut off device being operatively connected with said drawing off means.

4. In a measuring dispenser for liquids, the combination of a support for the inverted bottle, a measuring chamber into which the mouth of the inverted bottle projects so that the rising of the liquid within the chamber automatically seals the mouth of the bottle to stop the flow therefrom, the said measuring chamber being vertically adjustable relatively to said bottle-supporting means to vary the distance between the mouth of the bottle and the bottom of said chamber for varying the quantity of liquid measured by the chamber, means for drawing off the liquid from the measuring chamber, a cut off device adapted to cut off the flow of liquid from the bottle when the said drawing off means is opened, the said cut off device being operatively connected with said drawing off means.

5. In a measuring dispenser for liquids, the combination of a support for the inverted bottle, a measuring chamber into which the mouth of the inverted bottle projects so that the rising of the liquid within the chamber automatically seals the mouth of the bottle to stop the flow therefrom, the said measuring chamber being vertically adjustable and a cam device intermediate the said chamber and the said supporting means for adjusting the measuring chamber vertically, means for drawing off the liquid from the measuring chamber, the said bottle support and measuring chamber being relatively adjustable to vary the distance between the mouth of the bottle and the bottom of said chamber to vary the quantity of liquid measured by the said chamber, means for drawing off the liquid from the measuring chamber, a cut off device adapted to cut off the flow of liquid from the bottle when the said drawing off means is opened, the said cut off device being operatively connected with said drawing off means.

6. In a measuring dispenser for liquids, the combination of a rotatable casing, a support for the inverted bottle depending within said casing, a vertically adjustable measuring chamber into which said support depends, and provided with a valved outlet, a cam ring supporting said measuring chamber and engaging a fixed part on said casing, connections between said cam ring and casing whereby the turning movement of the casing raises or lowers the cam ring to adjust the measuring chamber and cut off device for stopping the flow of liquid from the bottle when the outlet valve of the measuring chamber is opened.

7. In a measuring dispenser for liquids, the combination of a rotatable casing, a support for the inverted bottle depending within said casing, a vertically adjustable measuring chamber into which said support depends, and provided with a valved outlet, a cam ring supporting said measuring chamber and engaging a fixed part on said casing, connections between said cam ring and casing whereby the turning movement of the casing raises or lowers the cam ring to adjust the measuring chamber, means extending to the exterior of said casing for locking the cam ring in adjusted position, and a cut off device for stopping the flow of liquid from the bottle when the outlet valve of the measuring chamber is opened.

8. In a measuring dispenser for liquids, the combination of a rotatable casing, a support for the inverted bottle depending within said casing, a vertically adjustable measuring chamber into which said support depends, and provided with a valved outlet, a cam ring supporting said measuring chamber and engaging a fixed part on said casing, the said casing being provided with a horizontal slot and the cam ring being provided with a vertical slot, a fixed member supporting said casing, a stud passing loosely through said fixed member, thence through the said horizontal slot of the casing and the vertical slot of the cam ring and provided with a fixed piece upon the interior of the cam ring and having a thumb screw upon the exterior end for clamping the parts together.

9. In a measuring dispenser for liquids, the combination of a support for the inverted-bottle, a measuring chamber into which the mouth of the inverted bottle projects so that the rising of the liquid within the chamber automatically seals the mouth of the bottle to stop the flow therefrom, the said bottle support and measuring chamber being relatively adjustable to vary the distance between the mouth of the bottle and the bottom of said chamber to vary the quantity of liquid measured by said chamber, means for relatively adjusting the said support and measuring chamber and a rotatable part operatively connected with said adjusting means whereby the rotation of said part causes said adjustment, a scale and a mark coöperating with the said rotatable part for setting said rotatable part at a predetermined point on the scale to obtain a predetermined measuring quantity of liquid, means for drawing off the liquid from the measuring chamber and means for simultaneously cutting off the flow of liquid from the bottle.

10. In a measuring dispenser for liquids, the combination of a support for the inverted bottle, a measuring chamber into which the mouth of the inverted bottle projects so that the rising of the liquid within the chamber automatically seals the mouth of the bottle to stop the flow therefrom, said measuring chamber being provided with a valved outlet, a movable carrier for said outlet valve, a valve for cutting off the flow of liquid from the bottle and the said valve being controlled by the movements of said carrier, and lifting device for raising the carrier to open the outlet valve.

11. In a measuring dispenser for liquids, the combination of a support for the inverted-bottle, a measuring chamber into which the mouth of the inverted bottle projects so that the rising of the liquid within the chamber automatically seals the mouth of the bottle to stop the flow therefrom, the said measuring chamber being provided with a valved outlet, a movable carrier for said outlet valve, means for cutting off the flow of liquid from the bottle when the outlet valve is open, and a lifting device extending to the exterior of said measuring chamber for engaging and lifting the said valve carrier, the movement of said lifter also controlling the movement of the means for cutting off the flow of liquid from the bottle.

12. In a measuring dispenser for liquids, the combination of a support for the inverted-bottle, a measuring chamber into which the mouth of the inverted bottle projects so that the rising of the liquid within the chamber automatically seals the mouth of the bottle to stop the flow therefrom, the said measuring chamber being provided with a valved outlet, a movable carrier for the outlet valve, means for cutting off the flow of liquid from the bottle when the outlet valve is open, and a lifting device extending to the exterior of said measuring chamber, and guided thereon in its movements, the said lifting device being adapted to be raised by the pressure against it of the edge of a drinking glass, the said means for cutting off the flow from the bottle being controlled by the movement of the said lifter.

13. In a measuring dispenser for liquids, the combination of a support for the inverted-bottle, a measuring chamber into which the mouth of the inverted bottle projects so that the rising of the liquid within the chamber automatically seals the mouth of the bottle to stop the flow therefrom, the said measuring chamber being provided with a valved outlet, a movable carrier for the outlet valve, means for cutting off the flow of liquid from the bottle when the outlet valve is open, a lifting device for the valve carrier comprising the horizontally disposed part mounted beneath and guided upon said measuring chamber and upwardly extended arms engaging and lifting said carrier, said arms being provided with the lateral projections and a fixed part engaged by said projections for supporting the lifter in normal position.

14. In a measuring dispenser for liquids, the combination of a support for an inverted bottle, a measuring-chamber in communication with the bottle-mouth, a valved outlet through which the measured liquid is drawn from said chamber, means for cutting off the flow of liquid from the bottle-mouth when the measured liquid is drawn from said chamber and said means being operatively connected with said outlet valve, an exterior casing in which said parts are contained, a hoop in which said casing is mounted, a set of legs secured to said hoop to support the same, a drip-pan having a tray therein and secured to the lower ends of said separating legs.

15. A dispensing device for fruit juice and other liquids, comprising means for supporting a bottle of the liquid in inverted position, a cup or receptacle surrounding the mouth of the bottle and provided with an opening in its bottom, a sealing device in said receptacle arranged when lowered to close said opening and when raised to seal the mouth of said bottle, and operating means for raising and lowering said sealing device, whereby charges of the liquid may be dispensed from said bottle into the receptacle upon lowering the sealing device, and from said receptacle upon raising the sealing device.

16. A dispensing device for fruit juice and other liquids, comprising means for supporting a bottle of the liquid in inverted position, a cup or receptacle adjustable with respect to said supporting means surrounding the mouth of the bottle and provided with an opening in its bottom, a sealing device in said receptacle arranged when lowered to close said opening and when raised to seal the mouth of said bottle, and operating means for raising and lowering said sealing device, whereby charges of the liquid may be dispensed from said bottle into the receptacle upon lowering the sealing device and from said receptacle upon raising the sealing device.

17. A dispensing device for fruit juice and other liquids, comprising an outer casing and supporting means therefor, bottle holding means supported by said casing for holding a bottle in inverted position, a cup or receptacle within said casing surrounding the mouth of the bottle and provided with an opening in its bottom, a sealing device in said receptacle arranged when lowered to close said opening and when raised to seal the mouth of said bottle, and means operable by a drinking glass arranged below said opening for raising and lowering said sealing device, whereby charges of the liquid may be dispensed from said bottle into the receptacle upon lowering the sealing device and from said receptacle into the glass upon raising the sealing device.

18. A dispensing device for fruit juice or other liquids, comprising a casing and supporting means therefor, bottle holding means supported by the casing for holding a bottle in inverted position, a cup or receptacle arranged within said casing surrounding the mouth of the bottle and provided with an opening in its bottom, means for raising and lowering said receptacle with respect to the casing and the mouth of the bottle, a sealing device in said receptacle arranged when lowered to close the opening in said receptacle and when raised to seal the mouth of the bottle, and operating means for raising and lowering said sealing device, whereby charges of the liquid may be dispensed from said bottle into the receptacle upon lowering the sealing device and from said receptacle upon raising the sealing device, and whereby the charge of liquid may be varied by raising and lowering said receptacle with respect to the mouth of the bottle.

19. A dispensing device for fruit juice and other liquids, comprising an outer casing and supporting means therefor, means within said casing for supporting the bottle in inverted position, a cover member at the top of said casing adjustable with respect thereto to close the space between the top of the casing and the bottle, a cup or receptacle surrounding the mouth of the bottle and provided with an opening in its bottom, a sealing device in said receptacle arranged when lowered to close said opening and when raised to seal the mouth of the bottle, whereby charges of the liquid may be dispensed from said bottle into the receptacle upon lowering the sealing device and from said receptacle upon raising the sealing device.

20. A dispensing device for fruit juice and other liquids, comprising means for supporting a bottle of the liquid in inverted position, a cup or receptacle surrounding the mouth of the bottle and provided with an opening in its bottom, a perforated cup-shaped sealing device carrying a valve for closing said opening when in lowered position and sealing means for sealing the mouth of the bottle when in raised position, whereby charges of the liquid may be dispensed from said bottle into the receptacle upon lowering the sealing device and from said receptacle upon raising the sealing device.

21. A dispensing device for fruit juice and other liquids, comprising an outer casing and supporting means therefor, bottle holding means supported by said casing for holding a bottle in inverted position, an inner sleeve within said casing, a cup or receptacle supported by said inner sleeve surrounding the mouth of the bottle and provided with an opening in its bottom, a sealing device in said receptacle arranged when lowered to close said opening and when raised to seal the mouth of the bottle, and means for raising and lowering said inner sleeve with respect to the outer casing, thereby raising and lowering the receptacle with respect to the mouth of the bottle, whereby the amount of liquid dispensed may be increased or decreased by raising or lowering said receptacle.

22. A dispensing device for fruit juice and other liquids, comprising an outer casing provided with supporting means, means supported by the upper end of said casing for holding a bottle in inverted position, an inner sleeve within said outer casing and vertically adjustable with respect thereto, means for effecting such vertical adjustment, clamping means for holding the inner sleeve in adjusted position, a cup or receptacle supported by said inner sleeve and adjustable therewith, said receptacle surrounding the mouth of the bottle and provided with an opening in its bottom, a sealing device in said receptacle arranged when lowered to close said opening and when raised to seal the mouth of said bottle, and operating means extending between said receptacle and outer casing for raising and lowering said sealing device by means of a drinking glass arranged below said opening, whereby charges of the liquid may be dispensed from said bottle into the receptacle upon lowering the sealing device and from said receptacle upon raising the sealing device, and whereby the charge of liquid dispensed can be varied by adjustment of the inner sleeve and receptacle.

In testimony whereof I have hereunto set my hand in the presence of the two subscribing witnesses.

ALONZO N. ROSE.

Witnesses:
EMANUEL A. STERN,
WILLIS FOWLER.